United States Patent
Klassen et al.

(10) Patent No.: US 8,934,121 B2
(45) Date of Patent: Jan. 13, 2015

(54) COORDINATED, DISTRIBUTED, REUSABLE DOCUMENT COMPONENT RESPOSITORY

(75) Inventors: R. Victor Klassen, Webster, NY (US); James M. Sweet, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 863 days.

(21) Appl. No.: 13/012,029

(22) Filed: Jan. 24, 2011

(65) Prior Publication Data
US 2012/0188590 A1 Jul. 26, 2012

(51) Int. Cl.
*G06F 15/00* (2006.01)
*G06F 3/12* (2006.01)

(52) U.S. Cl.
CPC ............ *G06F 3/1211* (2013.01); *G06F 3/1285* (2013.01); *G06F 3/124* (2013.01); *G06F 3/1247* (2013.01); *G06F 3/1243* (2013.01); *G06F 2206/1514* (2013.01)
USPC ...................................................... 358/1.15

(58) Field of Classification Search
USPC ............................................ 358/1.13, 1.15
See application file for complete search history.

(56) References Cited

U.S. PATENT DOCUMENTS

| | | | |
|---|---|---|---|
| 6,032,004 A | 2/2000 | Mirabella, Jr. | |
| 6,441,919 B1 * | 8/2002 | Parker et al. | 358/1.18 |
| 6,930,795 B1 | 8/2005 | Motamed et al. | |
| 7,161,705 B2 | 1/2007 | Klassen | |
| 7,505,172 B2 * | 3/2009 | Vondran et al. | 358/1.9 |
| 8,064,084 B2 * | 11/2011 | Khain | 358/1.15 |
| 2004/0179218 A1 | 9/2004 | Wissenbach | |
| 2004/0196470 A1 | 10/2004 | Christiansen | |
| 2004/0196495 A1 | 10/2004 | Christiansen | |
| 2005/0094175 A1 * | 5/2005 | Christiansen et al. | 358/1.13 |
| 2005/0094194 A1 | 5/2005 | Dolev et al. | |

* cited by examiner

*Primary Examiner* — Mark Zimmerman
*Assistant Examiner* — Lawrence Willis
(74) *Attorney, Agent, or Firm* — Gibb & Riley, LLC

(57) ABSTRACT

A receiving subsystem receives a print job to be raster image processed. A job splitter divides the print job into print job chunks and distributes the print job chunks to at least two raster image processors. The raster image processors perform raster image processing on corresponding ones of the print job chunks. A cache supervisor coordinates creation use and destruction of said reusable raster image objects by said raster image processors.

20 Claims, 6 Drawing Sheets

COORDINATED, DISTRIBUTED, REUSABLE DOCUMENT COMPONENT RESPOSITORY

BACKGROUND

Embodiments herein generally relate to processing print jobs and more particularly to processes that perform parallel raster image processing using multiple separate processors.

Before a print job is sent to a printing device, various processing steps need to be performed on the print job to allow the printing device to know where and how to make the various markings on the sheet of paper. One such process is known as raster image processing (RIP) and this processing determines (on a pixel-by-pixel basis) which pixels will have which color.

Raster image processing can require extensive computing resources. Therefore, various methodologies and systems have been developed in order to cope with the processing time required. One methodology stores components or objects that are reused at different points in the print job. A component or an object is some unit (image, portion of text, graph, etc.) that appears identically in different portions of the print job. Such systems reduce processing time by reusing such objects without having to perform raster image processing on the object each time it is needed. Objects that may be reused are stored in a reusable document component repository, or cache, until needed.

Additional methodologies reduce processing time by dividing the print job into different print job chunks and having multiple processors perform raster image processing simultaneously on the different print job chunks. Further description of dividing print jobs into chunks may be found in U.S. Pat. No. 7,161,705, the disclosure of which is incorporated herein by reference.

However, existing reusable document component repositories are limited to a single-writer single-reader model. A single RIP can write reusable components into the cache, and then later reuse them. Page parallel raster image processing is used to accelerate some jobs, but with caching disabled. Customers are sometimes given the choice of whether to RIP a print job in parallel or with caching, but need to choose based on their knowledge of the job. Some jobs run faster one way, others run faster the other way.

SUMMARY

One exemplary method embodiment herein receives (using a receiving subsystem) a print job to be raster image processed. The method divides the print job into chunks (such as pages or other units), using a job splitter and provides the chunks to at least two raster image processors. The method creates at least one communication thread between each of the raster image processors and a cache supervisor to allow the cache supervisor to control actions of each of the raster image processors over the communication threads. In addition, the method provides a unique identification of each raster image object within the print job to allow the creation of each raster image object to be monitored.

The raster image processors in turn perform raster image processing on corresponding ones of the chunks and the method monitors the raster image objects being created by the raster image processors, using the cache supervisor. The receiving subsystem receives indications from each of the raster image processors of raster image objects of the print job that are about to be raster image processed by the raster image processors. This includes the case where the supervisor receives these indications indirectly via cache managers that are in direct communication with the RIPs.

If one of the raster image processors (a "first" raster image processor) has started to create a first object, then the method prevents another (a "second") raster image processor from performing a duplicate creation of the first object. Instead, the cache supervisor causes the first raster image processor to send a copy of the first object to the second raster image processor after the first object is raster image processed.

Alternatively, the methods herein can perform an evaluation process when the second raster image processor attempts to create a duplicate of the first object (again, using the cache supervisor). This evaluation process determines a first amount of time it will take the second raster image processor create the first object and a second amount of time it will take the first raster image processor to send a copy of the first object to the second raster image processor. If the first amount of time is less than the second amount of time, the cache supervisor causes the second raster image processor to create a second copy of the first object. If the first amount of time is greater than the second amount of time, the cache supervisor causes the first raster image processor to send a copy of the first object to the second raster image processor.

In an additional alternative, if the first amount of time is greater than the second amount of time, the cache supervisor can create a first handle directing the second raster image processor to a location of the first object. The cache supervisor may provide the first handle to the second raster image processor only after the first raster image processor finishes creating the first object. Further, the cache supervisor can locally store the first object that is created remotely by the first raster image processor to provide the first object to other raster image processors as needed. This includes the case of the supervisor delegating responsibility for the actual work of storing to cache managers.

After the individual raster image processors complete the raster image processing of the objects, the method thus reassembles the processed to produce a raster image processed print job.

In addition to methods, the embodiments herein also include various different devices, such as a system. The system includes at least a receiving subsystem and a communications port. The receiving subsystem receives the print job to be raster image processed, and a job splitter divides the print job into chunks. The communications port is connected to at least two raster image processors external to the system and the job splitter distributes the chunks to at least two raster image processors through the communications port.

As described above, the various raster image processors perform raster image processing on corresponding ones of the chunks. The cache supervisor monitors raster image objects created by the raster image processors through different communication threads when the raster image processors are raster image processing the chunks. The cache supervisor coordinates creation use and destruction of the reusable raster image objects created by the raster image processors.

Again, if a first raster image processor of the raster image processors has started to create a first object, the cache supervisor can prevent a second raster image processor from creating a duplicate of the first object, and the cache supervisor can cause the first raster image processor to send a copy of the first object to the second raster image processor. Alternatively, the cache supervisor can make a determination of whether to rebuild or transmit the raster image objects depending upon transmission time. Further, the cache supervisor can locally cache raster image objects that have been remotely created.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
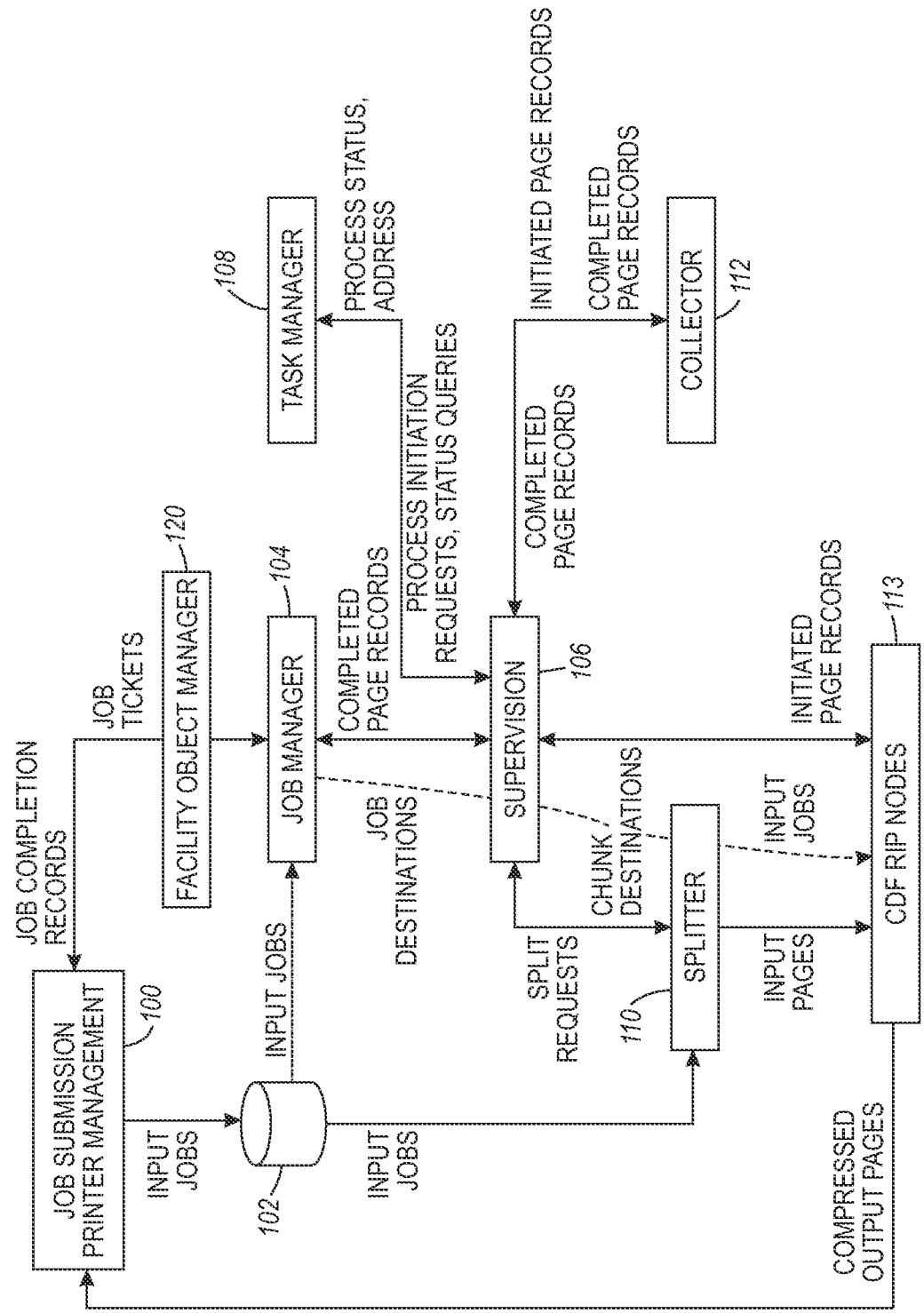
FIG. 1 is a schematic diagram of a system according to embodiments herein.

To provide customers an improved price/performance combination, without the need to choose between modes, the multiple readers/multiple writer problem mentioned above is addressed by embodiments herein, for either a symmetric multiprocessor (SMP) or distributed implementation. With embodiments herein, when cache items are created, a master processor is consulted. In some embodiments herein, if the cache item is already in the process of being created in another RIP on a different device or on the same multiprocessor device, the request is denied. Also, when a cache item is completed and entered in the cache, the master processor is informed of the creation time and location. Therefore, combining supplied identifications with page numbers enables identification re-use.

When cached items are needed, the master processor is consulted to determine where the item is, and the master processor either forces local creation, or transmission, whichever is faster. When pages are complete, the master processor is informed of the event. Further, when items are deleted, the master processor enqueues the deletion request, deferring the deletion until all pages prior to the deletion event have completed.

In a page parallel RIP (PPR) system (as described in U.S. Pat. No. 7,161,705, the complete disclosure of which is incorporated herein by reference) documents are received by a spooling system, which includes a language identification module. The document is routed to a language-specific splitter, under control of a PPR-supervisor. The splitter receives "chunk destinations" from the supervisor, which allocates work among the RIPs under its control. The splitter then directly transmits chunks to the RIPs according to the destinations it receives from the supervisor. RIPs report completion to the supervisor, which notifies a collector. The collector re-orders completion messages so that the pages appear to be completed in order from first to last, and informs the supervisor of page completions in the correct order. The supervisor then informs the printer control mechanism as page images become ready.

As mentioned above, a PPR system may be either SMP or distributed. The primary distinction between the two is whether all communication is among processors within a single box through shared memory, or whether it crosses from one box to another across a network, such as Ethernet. In many respects, the two are indistinguishable: in an SMP system, there may be multiple RIP processes running within a single box, while in a distributed system, there may well be multiple RIP processes running within each of several boxes, which are connected through a network. The term node refers to a process or processor at one end of a communication channel. In the case of an SMP system, the communication channel may use shared memory, while in the case of a distributed system, at least some communication channels will involve a network. For this reason, the distinction of a physical node is added, which, for an SMP system, is the entire computing platform on which the PPR system runs, while for a distributed system, is one of several or possibly many computing devices connected with a network. Each physical node may house several processes, or virtual nodes. To the extent possible, virtual nodes are unaware of whether they communicate with other virtual nodes directly through shared memory, or indirectly, through a network.

The embodiments herein add a single process (a manager) for each physical node. The manager contains multiple threads and the necessary synchronization mechanisms, so as to provide the necessary reusable document component repository (RDCR) services to any RIPs resident on the same physical node. While prior RDCR implementations may have used library calls within the RIP to access a dedicated portion of memory, these calls now result in communication with the RDCR manager process.

There are three kinds of events in a cached object's life: creation, use, and destruction. Objects (images, portions of text, graphs, etc.) are supplied with object IDs, which are unique among the objects that are to be in the cache, as pages are generated in order, and objects are created and destroyed as requested.

During creation, in one exemplary embodiment herein, the manager has one thread communicating with each RIP instance that connects to it, and one thread that manages overall resource allocation. When a new object is created, the manager creates a structure that includes, at the least, the object's ID, a flag to indicate that it is in the process of being created, and a page identifier to indicate the final page after which it is to be deleted. This structure is stored in a searchable data structure that can be searched by object ID.

During use, when one of the manager threads requests an object that is still being created, that thread is optionally blocked until the creation is completed. This request may be to create or to use. In the blocking case, regardless of whether the request was to create or use, the response that comes back to the second or subsequent requestor is that the object is already there (once that becomes true). For creation and use, no further mechanisms are required, since use is read-only, and therefore does not require any locking.

Alternatives to blocking are available with embodiments herein. The simplest alternative is redundant creation. With redundant creation there is the potential that the cache would fill sooner, but more importantly, if it takes 1 second for RIP 1 to create object A and RIP 2 discovers the need for object A 0.25 seconds later, RIP 2 will have access to object A 0.75 seconds sooner if it blocks. Furthermore, if enough tasks are running on a virtual node 113, having one process block will not necessarily result in an idle processor.

Another alternative to blocking applies when the RIP does not actually need the object, but only needs a handle (a link or other location identifier) to the object. Such a case applies in a print-time-assembly (PTA) environment, and to a more limited extent even in a conventional rip-time assembly environment. Here RIPs create objects as needed and cache them, constructing a description of a page as a collection of object handles and locations where they are to be placed. In this alternative, a handle to the object is returned as soon as enough information about the object is available to provide that handle. The RIP can now continue building the page based on the promise that the object will be available at assembly time. Depending on the real-time constraints of PTA, the RIP could block on pending objects before declaring the page complete, but need not block on the first incomplete object it encounters. If assembly is done at RIP time, the RIP will have to block, waiting for any in-progress objects to become available before proceeding with assembly, but it can continue to work on any other not-yet-cached objects that appear on the page, as well as any page-scope content. Page scope objects are objects that are not re-used beyond a given page. This alternative may provide improved performance in some situations, although the other alternatives might be preferred for reasons other than performance (such as simplicity of implementation in an existing system).

During deletion, any given RIP might request that an object be deleted. Here the issue is that that the RIP may be ahead of one or more other RIPs that have yet to finish pages preceding the one on which the deletion request occurs. Here several possibilities arise: sometimes the manager herein receives all page complete messages, and thereby tracks when the page can truly be deleted, replicating much of the work currently done by the collector; the manager herein also can contact the collector, asking to be informed when all pages before the one on which the object is deleted are completed; the collector then automatically informs the manager when every Nth page is completed, for some value of N. In this way the manager can delay deletion of an object until it is no longer in use. When the object is marked for deletion, its final page number is filled in with the value of the page being processed at the time.

A further complicating factor with deletion is that once an object has been deleted its identifier is available for re-use. When an object's deletion is pending, subsequent requests for that object need to have associated with them page numbers to indicate whether they are for the version awaiting deletion (in which case their page numbers will be less than the page number in the deletion request) or for a later version.

All of the above applies to any page or chunk parallel system in which multiple RIPs share a single reusable document component repository (RDCR). However, if the system is distributed across multiple hardware platforms additional considerations come into play. A distributed system may be redundant or (cached) unique. In a redundant system, each physical node 113 has an independent instance of RDCR, and objects are never transferred from one instance to another. Instead, they are computed on each node 113 as needed. In a cached unique system, there is one master instance of any object on only one node 113, and there may be more instances cached on other nodes 113. Either system requires coordinated deletion.

In the cached unique case, a centralized process is responsible for mediating creation when manager processes of multiple nodes field requests to create the same object (when a manager process on node A fields a request for object 42, while a manager process on node B also fields a request for object 42). This process can also handle requests to use or delete objects. In the redundant case, a centralized process can be used to ensure that all managers delete an object once it is ready to be deleted, or it may be handled by broadcasting deletion messages in a peer-to-peer fashion.

As shown in FIG. 1, in a distributed page parallel system, centralized processes include a splitter 110, a collector 112 and a supervisor 106. All of these processes are optimized to avoid being bottlenecks. When a job arrives from a client at job submission/printer management node 100, the input spooling system saves the content either in memory or on disk 102, and the language is determined. Languages include PostScript, PDF, PPML, unstructured ASCII text, IPDS, and others as needed.

The input spooling system 102 notifies a processing manager assembly for effecting the necessary supervisory functions (shown in FIG. 1 as job manager node 104, supervisor node 106 and task manager node 108), by indicating the language to job manager node 104. The job size (if it has been fully received), and how/where to find the data are also determined. Any of several well-known mechanisms may be used to communicate the location of the data, including a network filename for a distributed system, or a memory address for a centralized system.

The supervisor node 106 selects a splitter 110 using the determined language to select which splitter(s) is/are capable of splitting the job. A plurality of splitters is intended in a large system, in which case the supervisory function selects a splitter based on the estimated amount of pending work on all splitters' queues. The supervisor 106 also notifies the collector 112 that a new job exists in the system, and tells the spooling system 102 what the unique identifier for the new job is within the system. The supervisor node 106 generates unique identifiers so that it may communicate with multiple input spool systems without having their unique identifiers conflict.

The supervisor node 106 then informs the selected splitter 110 where to find the data (the supervisor does not look at the data), and the splitter 110 may begin splitting the file as soon as it is ready. The splitter 110 is multithreaded, so it can receive messages describing input jobs while it is splitting previous jobs. The supervisory function also informs the splitter 110 of the chunk parameters comprising the defining threshold boundaries of a chunk (maximum page count, maximum byte count).

The splitter 110 requests chunk destinations. The supervisor assigns chunks to RIP nodes 113 implementing a Common Decomposer Facility ("CDF") using estimates of the amount of work pending on the nodes 113. (A CDF provides translation from PDL form to print-ready form). Estimates are calculated based on the total amount of work assigned to a physical RIP processor, as a given physical node 113 may have both a RIP and a splitter running on them. The supervisor node 106 only provides a small number (such as 3) of destinations to the splitter 110 to allow it to optimize its estimation of the amount of work assigned to each physical processor.

The splitter 110 splits the job into chunks. At each page boundary the splitter 110 checks to see whether the page count or byte count has been exceeded, and if either one has, it finishes that chunk. As it splits a job into chunks, it sends the chunk to the next destination it has received from the supervisor node 106. It writes the chunk into either a CDF memory or the disk associated with the node 113 that the destination assigned by the supervisor indicates. In one embodiment the data for a chunk is written into the memory, rather than disk. The splitter 110 uses a separate thread to copy the data to a RIP node 113, so that it can continue splitting without being limited by network transfer time or the speed of the receiving node 113.

After the splitter 110 writes the first page of a chunk, it notifies the supervisor node 106, which, in turn, notifies a RIP node 113, and the collector 112. The collector maintains a set of jobs in the system, and for each job, a list of chunks in order of arrival.

A RIP node 113 has multiple threads or processes, one of which handles the receiving end of the data transfer. The splitter 110 and the RIP nodes 113 use some means of communicating, such as by sending a separate message, whether or not the splitter 110 has completed writing that chunk. Or the supervisor node 106 could send a message to the RIP nodes 113 when it receives notification from the splitter 110. When a RIP node 113 attempts to read beyond the end of the data written thus far, it blocks. If it attempts to read beyond the end of data written when the splitter 110 has finished the chunk, it receives an end of file signal.

When the splitter 110 completes a chunk it sends a message to the supervisor informing it of which pages have been written; the supervisor informs the collector of which pages to associate with a given chunk. After the splitter 110 has written several chunks, multiple RIP nodes 113 operate in parallel, writing pages of print ready data. This data is written in compressed form, such as mixed raster content files, to internal memory data buffers.

As a RIP node 113 completes a chunk, it sends a message to the supervisor, which passes the message on to the collector 112. The collector notes that this chunk is complete, and as long as it finds the first in the list for this job is complete, it removes the first in the list, and informs the supervisor node 106. The supervisor node 106 notifies the input spooling system of the location of the output data for that chunk. When the splitter 110 completes a job, it informs the supervisor node 106, which informs the collector 112 to expect no more new chunks for that job.

When the collector 112 receives the last message from the supervisor that a RIP node 113 has completed a chunk, it knows it because that job has an associated end-of-job message, and the list of chunks becomes empty when that chunk is removed from the list. The collector 112 then informs the supervisor node 106, which informs the input spooling system that the job is complete. The compressed output pages for the completed output job are returned to printer management 100 for transmission to a print engine.

There is some number, not less than 1, of physical RIP nodes 113, each of which has at least one RIP running on it. Each physical RIP node 113 has an instance of RDCR. One additional centralized process is the RDCR supervisor 106. In a minimal embodiment, there is no centralized RDCR supervisor 106, and the instances of RDCR on the physical RIP nodes 113 operate independently of each other.

Generally, there is one RDCR supervisor 106 in the entire system, whereas there is one RDCR manager per node. With embodiments herein it is possible that a supervisory RDCR manager can be elected from among the RDCR managers, rather than being a separate process. While its functionality could be subsumed by the PPR supervisor in the some embodiments it is not preferred to do so, since its activity is generally independent of other PPR supervisor functions, and therefore can be run in parallel without slowing down either one.

The RDCR supervisor 106 maintains a map of created objects, searchable by ID, and creation page number within ID. Each object has associated with it destruction page number (initially −1), and a collection of physical nodes 113 on which that object has been instantiated, and a flag indicating whether it has been created or is still in process.

The first step in creating a re-usable object is to create a unique identifier for that object. In the case of IPDS a host assigned identifier (HAID) is supplied. In the cases of PostScript and PDF, the identifier is created based on properties of the object including an identifier supplied with the PDL, transformation information and rendering intent information.

One part of identifier creation is that if multiple RIPs attempt to create the same object, they first request an identifier that uniquely maps to that object, based on that object's properties. In this way they all receive the same identifier. Creating identifiers may be done through library calls, in which case the identifier must be uniquely generated based only on the object properties, or through communication with a centralized process, in which case the identifier may be generated both on the object properties and such variables as the time of day or page number when first requested.

A second step in creating a re-usable object is to contact the RDCR supervisor 106, supplying the unique identifier. The RDCR supervisor 106 will (1) determine whether the object has already been started; (2) if the object has already been started, wait until the object is finished, and respond with the object's location; (3) otherwise, the supervisor 106 will remember that the object is started (now), and tell the requesting RIP to rasterize the object. Assuming the (3) branch is taken, the requesting RIP will (4) rasterize the object, (as before); (5) transmit the object to the local RDCR, supplying the unique identifier; and (6) inform the RDCR supervisor 106 that the object has been created. In the non-blocking embodiment, at step 2, the RDCR supervisor 106 supplies the RIP with enough information to continue building the page, without waiting for the object to be completely rasterized. Steps 3-6 are unchanged.

In one embodiment, objects are not created until a cache miss occurs. That is, RIPs assume that the objects already exist in the cache, and if they are informed otherwise, they create the object and put it in the cache. In this embodiment, the RIP encountering the object will contact the RDCR supervisor 106, (as before), and will either be told to rasterize it, or be given the object's location, possibly after a short delay.

When an object is used, the RIP contacts its manager 106 (RDCR_mgr) to either obtain a copy of the object or permission to create it. The manager 106 first checks to see whether the object exists locally, and if so, returns a pointer to it. If the object does not exist locally, the manager 106 contacts the RDCR supervisor 106. The RDCR supervisor 106 has a list of objects, and for each object, the list of nodes 113 on which it exists, an estimated transmission time, and the actual construction time. In one embodiment, if the transmission time is less than the construction time the RDCR supervisor 106 informs the requesting manager 106 (on the destination node) of a node on which the object exists (a source node), and the destination node manager 106 contacts the source node manager 106, which transmits it to the destination node. Then the destination node manager 106 provides the requesting RIP with a pointer to the object. If the transmission time is larger than the construction time, the RDCR supervisor 106 tells the manager 106 to report a cache miss, and the RIP creates the object and caches it locally. In the non-blocking case, it may sometimes be beneficial to wait for the transmission of an object previously cached on another node even if the transmission time exceeds the creation time, assuming there are additional not-yet-cached objects or page-scope components on the page. If the estimated creation time of the remaining objects exceeds the transmission time, then the transmission can take place in the background while the remaining objects for the page are created.

Alternatively, in the non-blocking case, the RDCR supervisor 106 might always have the first node 113 on which an object is created (rasterized) transmit it to all other nodes 113 that register a request for it. Every time a local manager 106 copies an object into a local RDCR, whether from a RIP creating it or by copying it from a peer, the manager 106 informs the RDCR supervisor 106, which updates its list of nodes 113 associated with that object ID.

Transmission time can be computed using theoretical network bandwidths scaled down by a constant factor (such as 0.9) based on average real-world performance. In the preferred embodiment, however, whenever an object is transferred across the network to a local RDCR from a remote RDCR, the local manager 106 can inform the RDCR supervisor 106 of the experienced bandwidth (such as in Mbytes per second), and the manager 106 can maintain an average data transfer rate over the last few transfers, either overall, or per peer-peer pair.

Sometimes, an object deletion request may precede its last use. The complication with the distributed system is that a deletion request might arrive at only one node, but need to be propagated to all nodes where the object is stored. This applies both to the redundant and the cached unique cases.

In the cached unique case, a deletion request is sent to the centralized supervisor 106 that forwards it to all nodes that have that object. The deletion request contains both the object ID and the page on which to delete the object. While an object is pending deletion, its ID may be re-used. In the cached unique case the supervisor 106 needs to maintain versioning. In the redundant case, a deletion request is forwarded to all peers, which delete the object once their local RIPs have completed the required page.

Figure 2:
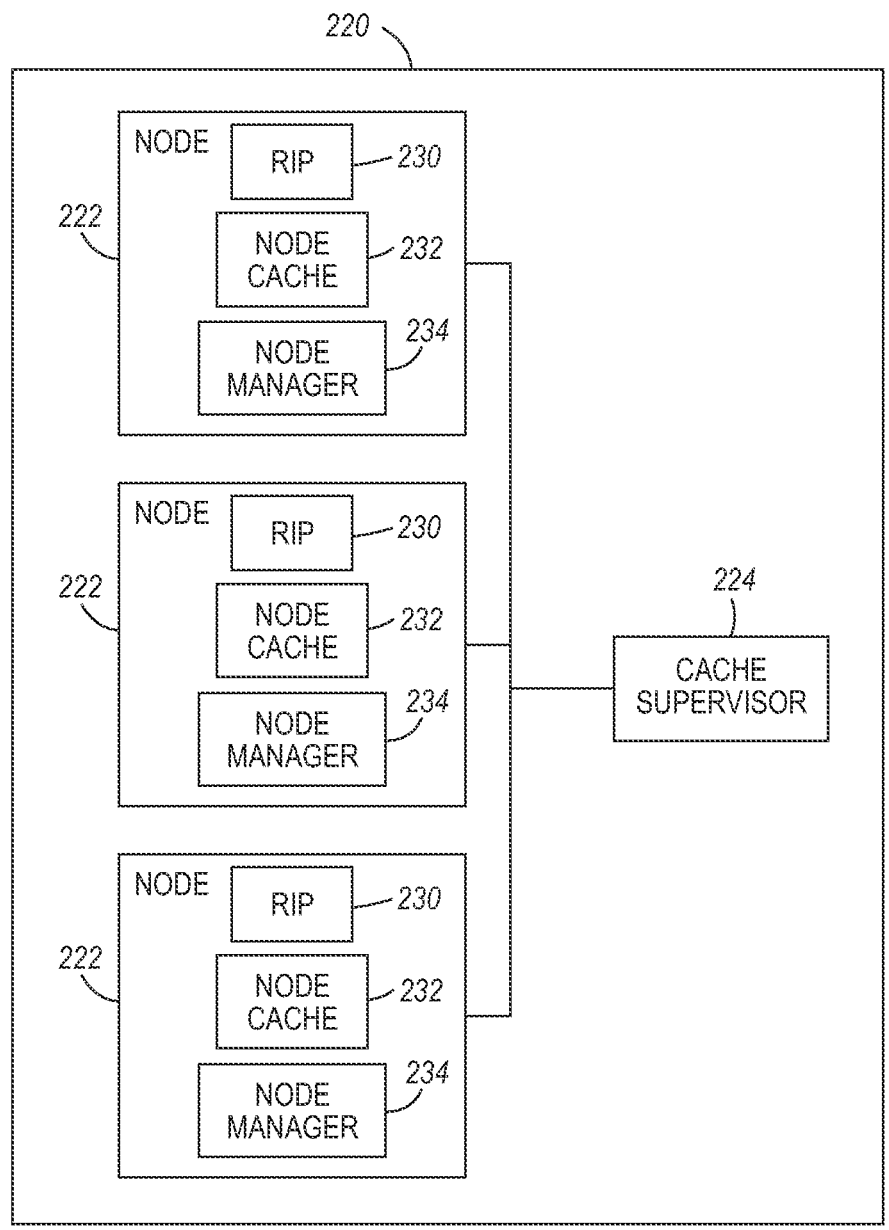
FIG. 2 is a schematic diagram of a system according to embodiments herein.

One exemplary system 220 implementation, shown in FIG. 2, includes parallel nodes 222 each having a reusable document component node cache 232, in which components have unique identifiers and deletion page numbers. Each node 222 also includes its own raster image processor(s) 230 and node manager 234. As also shown in FIG. 2, a cache supervisor 224 manages the reusable document component node caches 232, to insert components into the caches 232, supply components from the caches 232 and delete components in the caches 232, wherein deletion is delayed until all pages prior to the deletion page number have been deleted. The cache supervisor 224 coordinates creation, use and destruction of the reusable raster image objects created by the raster image processors 230.

Figure 3:
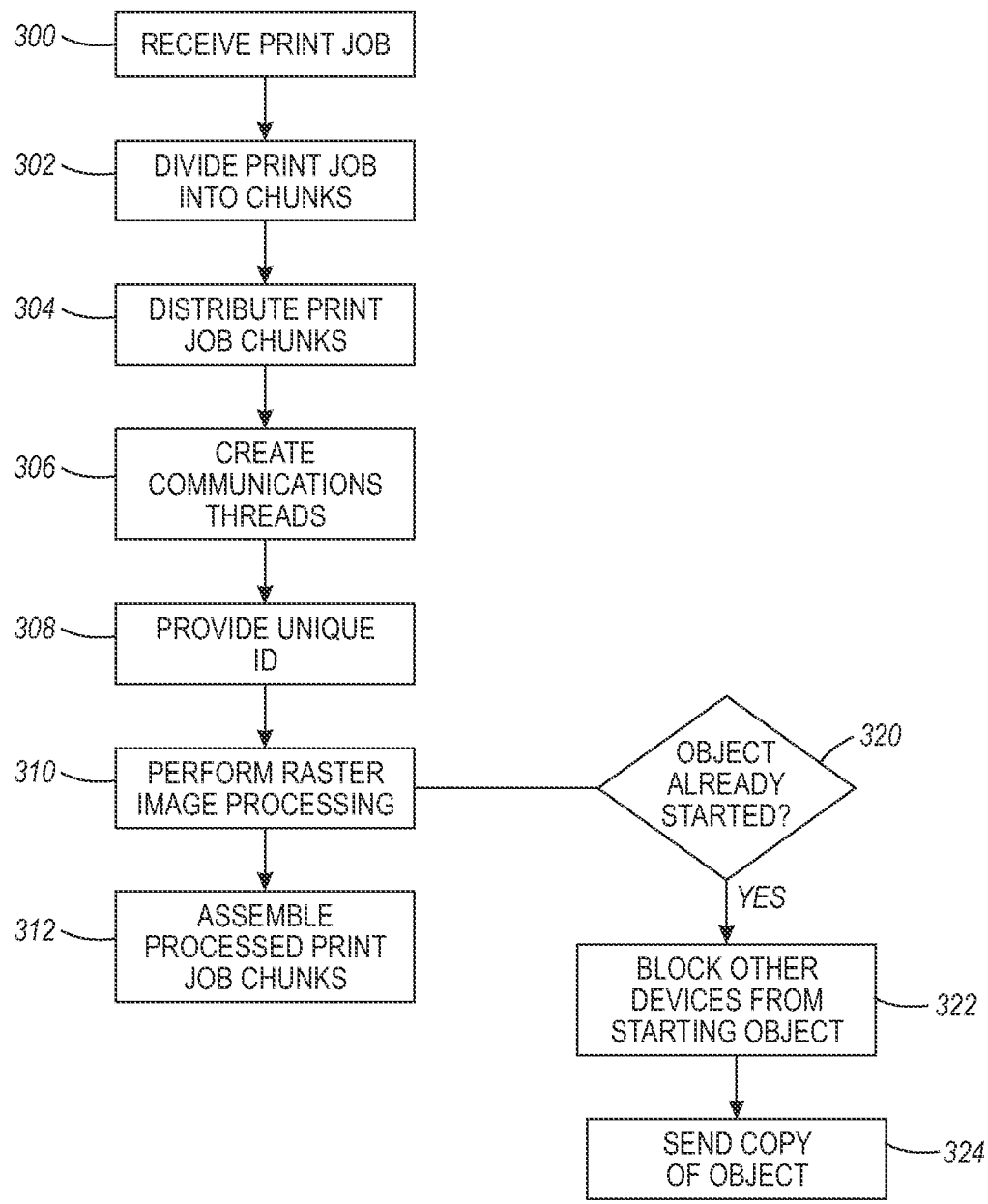
FIG. 3 is a flow diagram illustrating various embodiments herein.

FIG. 3 illustrates one exemplary method embodiment herein in flowchart form. As shown in item 300 this exemplary method receives (using a receiving subsystem) a print job to be raster image processed. The method divides the print job into print job segments, using the cache supervisor in item 302.

In item 304, this method distributes the print job segments to at least two RIPs. The method creates at least one communication thread between each of the RIPs and the cache supervisor to allow the cache supervisor to control actions of each of the RIPs over the communication threads in item 306. In addition, the method provides a unique identification (comprising, for example, an ID potentially combined with a page number) of each raster image object within the print job to allow the creation of each raster image object to be monitored, using the receiving subsystem in item 308. The RIPs in turn perform raster image processing on corresponding ones of the print job segments in item 310.

The method monitors the raster image objects being created by the raster image processors, and the cache manager receives indications from each of the raster image processors of raster image objects of the print job that are about to be raster image processed by the raster image processors. If one of the raster image processors (a "first" raster image processor) has started to create a first object (as shown in item 320) then the method prevents another (a "second") raster image processor from performing a duplicate creation of the first object in item 322.

Then, the cache supervisor causes the first raster image processor to send a copy of the first object to the second raster image processor after the first object is raster image processed in item 324. In addition, in item 324, rather than sending a copy of the object, the cache supervisor can create a first handle directing the second raster image processor to a location of the first object.

The cache supervisor may provide the first handle to the second raster image processor only after the first raster image processor finishes creating the first object or can send the handle immediately. Thus, the requesting RIP may discover it needs an object, and the cache supervisor notes that another RIP has already started the object. The requesting RIP may first notice the object, but may not actually need it yet. So the requesting RIP volunteers to the supervisor to create it, but some other RIP may get there first, so the supervisor creates only a handle and passes it to the requesting RIP. Now later, that requesting RIP actually may need the object to assemble the page. The requesting RIP now contacts its cache manager, who interprets the handle in order to figure out whether the object is in the local cache (multiple RIPs on the same node share a local cache) or a remote one (created by a RIP on a remote node). If it is remote, the local cache manager contacts the corresponding remote cache manager to get a copy. Once it is local, and complete, the local cache manager provides it to the requesting RIP.

After the individual raster image processors complete the raster image processing of the objects, the method reassembles the raster images to produce a raster image processed print job in item 312.

Figure 4:
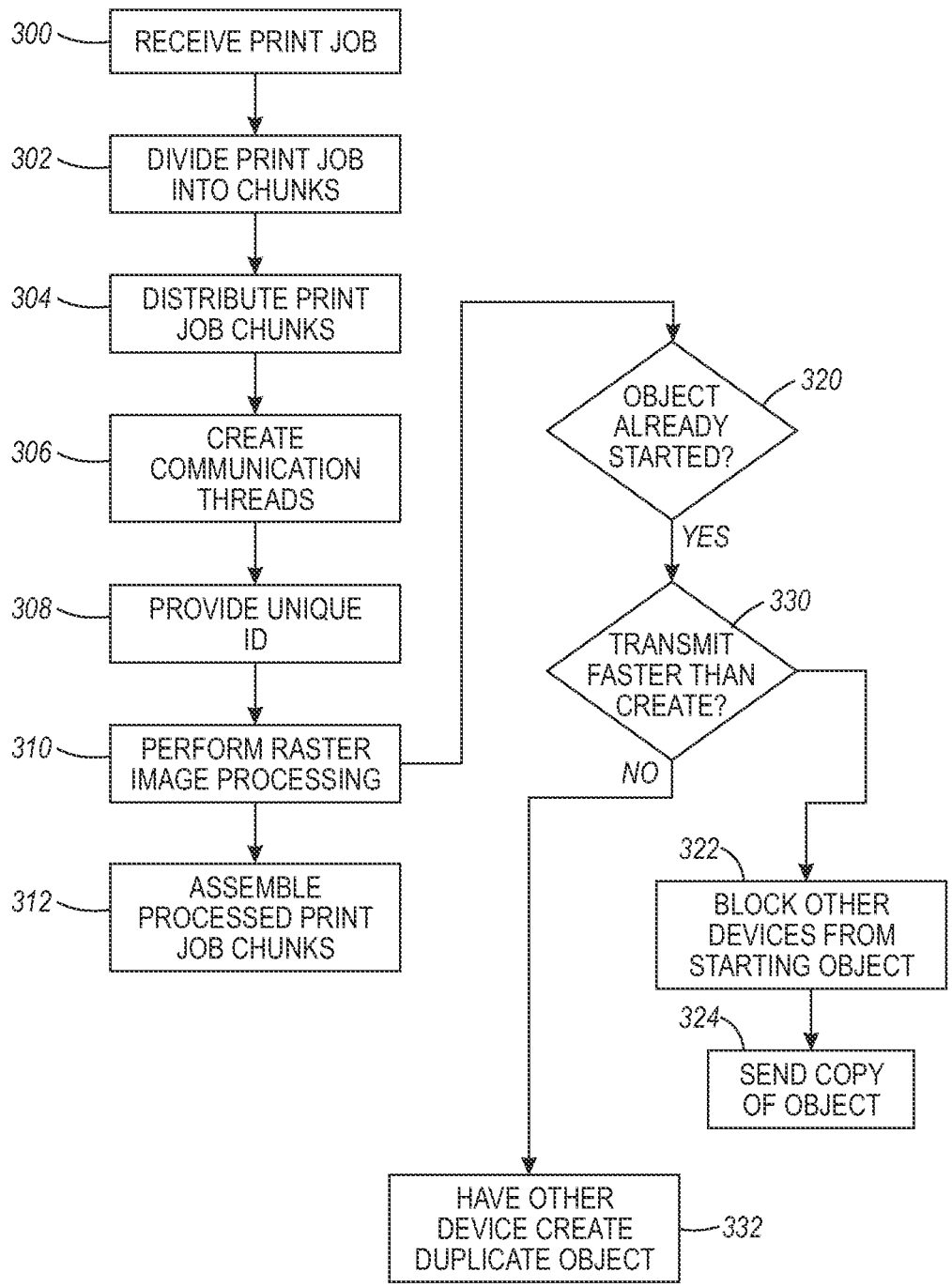
FIG. 4 is a flow diagram illustrating various embodiments herein.

Alternatively, as shown in FIG. 4, the methods herein can perform an evaluation process when the second raster image processor attempts to create a duplicate of the first object (again, using the cache supervisor). More specifically, FIG. 4 is similar to FIG. 3, except in FIG. 4 when the object has already started to be created by the first raster image processor in item 320 processing proceeds to an evaluation process 330 which determines whether it is faster to transmit the first object to the second raster image processor than it is to simply allow the second raster image processor to make a duplicate copy of the first object. More specifically, in item 330, the evaluation process determines a first amount of time it will take the second raster image processor create the first object and a second amount of time it will take the first raster image processor to send a copy of the first object to the second raster image processor.

If the first amount of time (the time it will take the second raster image processor create a duplicate of the first object) is less than the second amount of time (the transmission time) the cache supervisor causes the second raster image processor to create a second duplicate copy of the first object in item 332. If the first amount of time is greater than the second amount of time, the cache supervisor blocks the second device from starting the first object (322) and causes the first raster image processor to send a copy of the first object to the second raster image processor (324) as discussed above in FIG. 3.

Further, the cache manager can locally store the first object that is created remotely by the first raster image processor to provide the first object to other raster image processors as needed.

Figure 5:
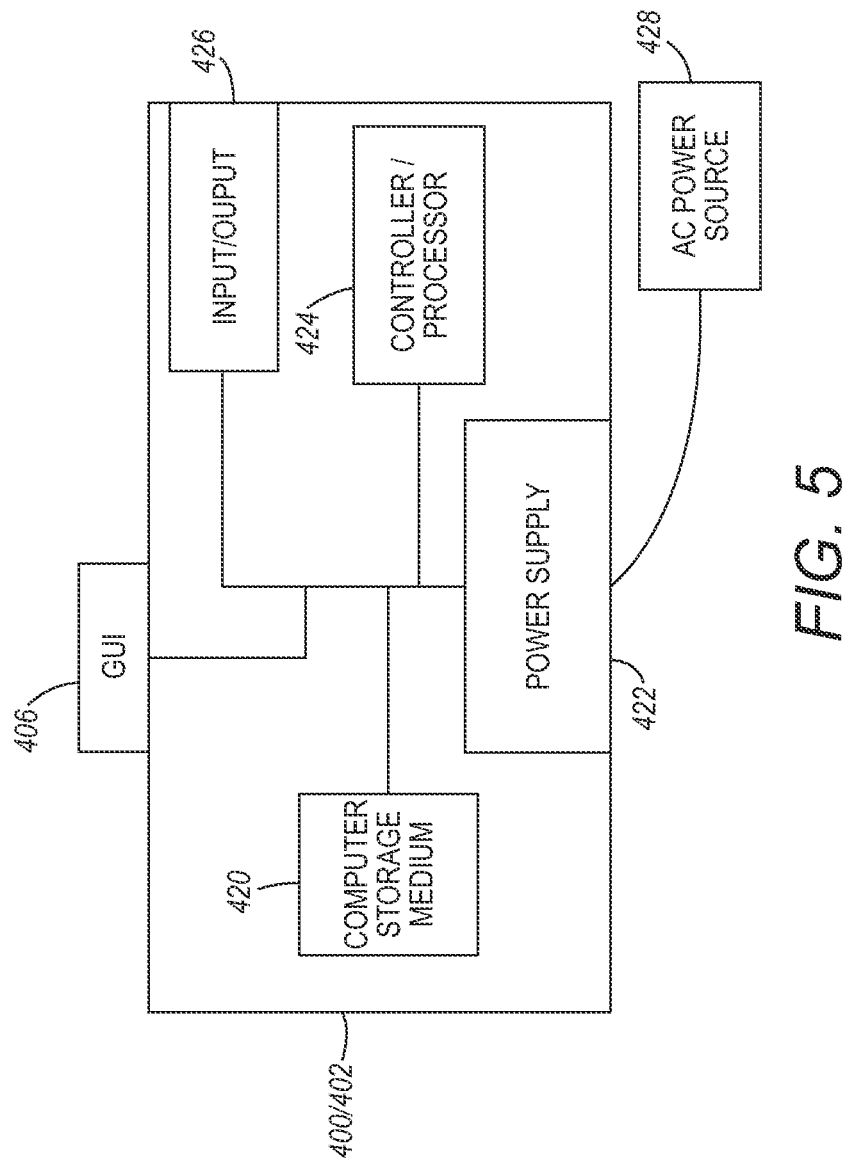
FIG. 5 is a side-view schematic diagram of a printing device according to embodiments herein.
Figure 6:
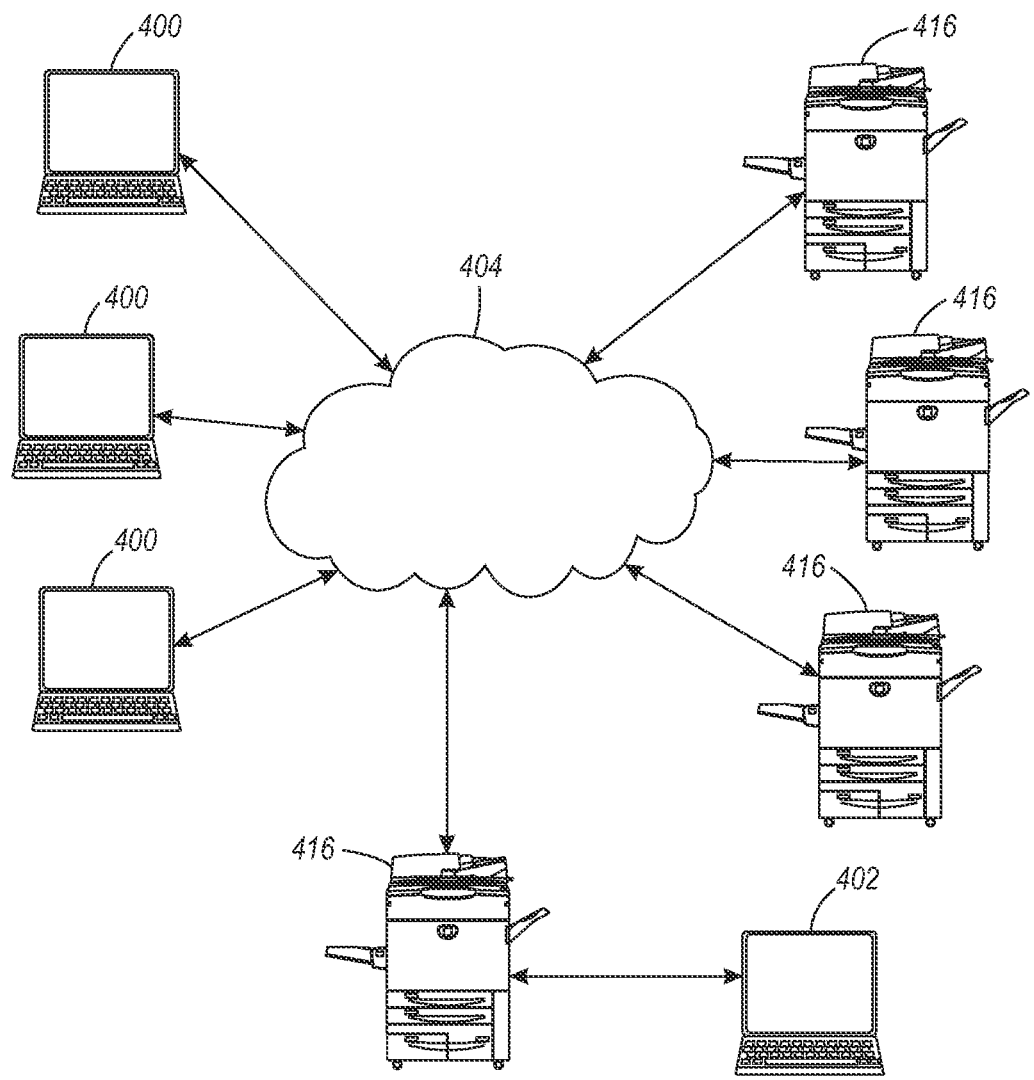
FIG. 6 is a side-view schematic diagram of a network according to embodiments herein.

In addition to methods, the embodiments herein also include various different devices, such as a computing device 402 and network 404 shown in FIGS. 5 and 6. These further embodiments comprise at least one computerized device 400/402 that includes a controller/processor 424, a communications port (input/output) 426 operatively connected to the processor 424 and to a computerized network 404 external to the computerized device 400/402, and a graphic user interface 406. A power supply 422 connects to an external alternating current power source 428 and converts the external power into the type of power needed by the various components.

A non-transitory computer storage medium 420 (which can be optical, magnetic, capacitor based, etc.) is readable by the processor 424 and stores instructions that the processor 424 executes to perform its various functions, such as those described herein.

The computerized device 400/402 is operatively connected to various printing devices 416 through the computerized network 404. The various printing devices 416 may use different raster image processors, different hardware and software protocols, etc.

The communications port 426 receives the print job to be raster image processed, and the processor divides the print job into print job segments. The communications port 426 of the computing device 400/402 is connected to the processor 424 and the processor 424 distributes the print job segments to at least two raster image processors.

As described above, the various raster image processors perform raster image processing on corresponding ones of the print job segments. The processor 424 monitors raster image objects created by the raster image processors through different communication threads when the raster image processors are raster image processing the print job segments.

Again, if a first raster image processor has started to create a first object, the processor 424 can prevent a second raster image processor from creating a duplicate of the first object, and the processor 424 can cause the first raster image processor to send a copy of the first object to the second raster image processor. Alternatively, the processor 424 can make a determination of whether to rebuild or transmit the raster image objects depending upon transmission time and building cost. Further, the processor 424 can locally cache raster image objects that have been remotely created, using storage 420.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes as well as various inkjet based processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
   receiving, by a receiving subsystem, a print job to be raster image processed;
   providing unique identifiers to reusable raster image objects within said print job using a cache supervisor;
   dividing said print job into chunks, using a job splitter;
   providing, by said job splitter, said chunks to at least two raster image processors, said raster image processors performing raster image processing on corresponding ones of said chunks; and
   coordinating creation of said reusable raster image objects by said raster image processors using said cache supervisor, said coordinating comprising, if a first raster image processor of said raster image processors is in a process of creating a first object, preventing a second raster image processor of said raster image processors from performing a duplicate creation of said first object based on an evaluation of a first amount of time it will take said second raster image processor create said first object and a second amount of time it will take said first raster image processor to send a copy of said first object to said second raster image processor.

2. The method according to claim 1, further comprising monitoring raster image objects created by said raster image processors when raster image processing said chunks,
   said monitoring comprising said cache supervisor receiving indications from each of said raster image processors of raster image objects of said print job that are about to be raster image processed by said first and second raster image processors.

3. The method according to claim 1, further comprising a cache manager storing a first object.

4. The method according to claim 1, further comprising:
   said cache supervisor creating a first handle directing said second raster image processor to a location of a first object; and
   said cache supervisor providing said first handle to said second raster image processor only after said first raster image processor finishes creating said first object.

5. The method according to claim 1, further comprising:
   reassembling, by said first and second raster image processors, processed chunks to produce a raster image processed print job from said print job.

6. A method comprising:
   receiving, by a receiving subsystem, a print job to be raster image processed;
   providing unique identifiers to reusable raster image objects within said print job using a cache supervisor;
   dividing said print job into chunks, using a job splitter;
   providing, by said job splitter, said chunks to at least two raster image processors, said raster image processors performing raster image processing on corresponding ones of said chunks;
   coordinating creation of said reusable raster image objects by said raster image processors using said cache supervisor; and if a first raster image processor of said raster image processors is in a process of creating a first object, performing an evaluation process when a second raster image processor attempts to create said first object, using said cache supervisor, said evaluation process comprising: determining, by said cache supervisor, a first amount of time it will take said second raster image processor create said first object and a second amount of time it will take said first raster image processor to send a copy of said first object to said second raster image processor;

if said first amount of time is less than said second amount of time, said cache supervisor causes said second raster image processor to create a second copy of said first object; and if said first amount of time is greater than said second amount of time, said cache supervisor causes said first raster image processor to send a copy of said first object to said second raster image processor.

7. The method according to claim 6, further comprising monitoring raster image objects created by said raster image processors when raster image processing said chunks, said monitoring comprising said cache supervisor receiving indications from each of said raster image processors of raster image objects of said print job that are about to be raster image processed by said raster image processors.

8. The method according to claim 6, further comprising a cache manager storing said first object.

9. The method according to claim 6, further comprising, if said first amount of time is greater than said second amount of time: said cache supervisor creating a first handle directing said second raster image processor to a location of said first object; and said cache supervisor providing said first handle to said second raster image processor only after said first raster image processor finishes creating said first object.

10. The method according to claim 6, further comprising:

reassembling, by said raster image processors, processed chunks to produce a raster image processed print job from said print job.

11. A method comprising:

receiving, by a receiving subsystem, a print job to be raster image processed;

providing unique identifiers of each reusable raster image objects within said print job, using a cache supervisor;

dividing said print job into chunks, using a job splitter;

providing, by said job splitter, said chunks to at least two raster image processors, said raster image processors performing raster image processing on corresponding ones of said chunks;

creating at least one communication thread between each of said raster image processors and said cache supervisor, actions of each of said raster image processors being controlled by said cache supervisor over said communication thread;

monitoring raster image objects created by said raster image processors when raster image processing said chunks, using said communication thread; and if a first raster image processor of said raster image processors is in a process of creating a first object, as identified by said unique identifier:

said cache supervisor preventing a second raster image processor of said raster image processors from creating said first object based on an evaluation of a first amount of time it will take said second raster image processor create said first object and a second amount of time it will take said first raster image processor to send a copy of said first object to said second raster image processor, and said cache supervisor causing said first raster image processor to send a copy of said first object to said second raster image processor.

12. The method according to claim 11, said monitoring comprising said cache supervisor receiving indications from each of said raster image processors of raster image objects of said print job that are about to be raster image processed by said raster image processors.

13. The method according to claim 11, further comprising a cache manager storing said first object.

14. The method according to claim 11, further comprising:

said cache supervisor creating a first handle directing said second raster image processor to a location of said first object; and said cache supervisor providing said first handle to said second raster image processor only after said first raster image processor finishes creating said first object.

15. The method according to claim 11, further comprising:

reassembling, by said raster image processors, processed chunks to produce a raster image processed print job from said print job.

16. A system comprising:

a receiving subsystem receiving a print job to be raster image processed, said receiving subsystem providing unique identifiers to reusable raster image objects within said print job;

a job splitter dividing said print job into chunks, said job splitter providing said chunks to at least two raster image processors, said raster image processors performing raster image processing on corresponding ones of said chunks; and a cache supervisor coordinating creation of said reusable raster image objects by said raster image processors, said cache supervisor, if a first raster image processor of said raster image processors is in a process of creating a first object, preventing a second raster image processor of said raster image processors from performing a duplicate creation of said first object based on an evaluation of a first amount of time it will take said second raster image processor create said first object and a second amount of time it will take said first raster image processor to send a copy of said first object to said second raster image processor.

17. The system according to claim 16, said cache supervisor monitoring raster image objects created by said raster image processors when raster image processing said chunks, said monitoring comprising said cache supervisor receiving indications from each of said raster image processors of raster image objects of said print job that are about to be raster image processed by said raster image processors.

18. The system according to claim 16, further comprising a cache manager storing a first object.

19. The system according to claim 16, said cache supervisor creating a first handle directing said second raster image processor to a location of said first object, and said cache supervisor providing said first handle to said second raster image processor only after said first raster image processor finishes creating said first object.

20. The system according to claim 16, said raster image processors reassembling processed chunks to produce a raster image processed print job from said print job.

\* \* \* \* \*